UNITED STATES PATENT OFFICE.

BENJAMIN TANNER, OF NEW BRIGHTON, ENGLAND.

IMPROVEMENT IN THE MANUFACTURE OF SUPERPHOSPHATE OF LIME.

Specification forming part of Letters Patent No. 140,559, dated July 1, 1873; application filed July 20, 1871.

*To all whom it may concern:*

Be it known that I, BENJAMIN TANNER, of New Brighton, in the county of Chester, England, have invented certain "Improvements in the Manufacture of Superphosphate of Lime," of which the following is a specification:

My invention consists in certain improvements in the manufacture of superphosphate of lime for the purposes of artificial manures, whereby the same is produced in an economical manner and in a highly concentrated form, while such control is afforded over its solubility as to enable it to be produced in such condition that it shall act with great rapidity when applied to the land, or be more slowly available for the growing crops, according as the peculiar requirements of any soil may render desirable.

1. Solutions of any of the forms of the phosphates of lime of commerce, or precipitated or otherwise prepared phosphates of lime, or mixtures thereof, are obtained by the use of hydrochloric acid or phosphoric acid, or mixtures thereof, as a solvent or solvents, in a more or less diluted form, by means of arrangements adapted for the purpose, and which are well known and understood. Solutions are also obtained by dissolving in water the crystals formed by the use of strong hydrochloric acid or phosphoric acid upon phosphate of lime. Such solutions are chemically examined, and their composition determined, especially in relation to the quantities of phosphoric acid and lime or calcium which they contain, and they are then treated by the processes hereinafter described, so as to bring them into such a condition that upon evaporation and final decomposition they shall yield superphosphate of lime having the desired quality and character. Subject to the principles hereinafter laid down in the fifth paragraph hereof, it is preferred to have the phosphoric acid and lime or calcium present in the proportion of seventy-one parts of phosphoric acid for twenty-eight parts of lime or twenty parts of calcium. If it is found by the said chemical examination that the lime or calcium present is in excess of the desired quantity, then the solution is treated in the manner described in the second and third paragraphs of this specification; but if it is found by such chemical examination that the phosphoric acid present is in excess of the desired quantity, then the solution is treated in the manner described in the paragraph hereof numbered 4. If, however, the phosphoric acid and lime or calcium are present in the desired quantity, then the solution is evaporated to dryness in convenient and suitable evaporating pans or furnaces, (as will be well understood by persons conversant with such operations,) and the heat maintained until the final decomposition is completed. The final decomposition and the complete removal of hydrochloric acid are greatly facilitated by passing superheated steam or hot air over the evaporating pans or furnaces. The dry residue is superphosphate of lime, more or less intermixed with impurities, from which it may be separated by dissolving it in water, which solution is subsequently evaporated, yielding a very concentrated superphosphate of lime. Any fumes of hydrochloric acid thrown off are condensed by the usual and well-known arrangements applicable for such purpose.

2. When it is necessary to remove any of the lime or calcium from such solutions, it is accomplished by the addition of sulphuric acid, or oxalic acid, or mixtures thereof, which are added by preference (subject, as before mentioned) in such proportions that twenty parts of calcium or twenty-eight parts of lime are left in the solution available for every seventy-one parts of phosphoric acid. If ten tons of the solution to be dealt with contained ten per cent. of phosphoric acid and ten per cent. of calcium, the addition of about forty-eight hundred-weight of sulphuric acid, containing sixty per cent. of anhydrous sulphuric acid or about forty-five hundred-weight of oxalic acid, or any proportionate mixture thereof, would remove the excess of lime. When any sulphuric acid is used, the mixture, after agitation, should pass to a filtering-bed, and the clear solution separated, or such separation may be conveniently effected by allowing the precipitated sulphate of lime to settle down, and by subsequent decantation of the clear solution. In each case the sulphate of lime is washed, and the wash-liquors treated similarly to the clear solution. When sulphuric acid has not been used, the mixture, after agitation, is passed away in a clear solution, either with or without filtration. These clear solutions are thus prepared and ready for evaporation and final decomposition, which processes are carried out as described in paragraph of this specification numbered 1, and the superphosphate of lime is purified, as therein described.

3. In some cases it is found desirable, instead of removing lime to make it balance the phosphoric acid, to add phosphoric acid to balance the lime, so that the solution shall, after such admixture, contain phosphoric acid, by preference, in the proportion of seventy-one parts of phosphoric acid for every twenty-eight parts of lime or twenty parts of calcium. If ten tons of solution contained ten per cent. of phosphoric acid and ten per cent. of calcium, the addition of about twelve tons and three-quarters of phosphoric acid of twenty per cent. purity will balance the excess of calcium present. When the phosphoric acid contains impurities which separate the lime, such as, for example, sulphuric acid, it is necessary to make allowance for the lime which is thus removed, and to use proportionately less phosphoric acid. After agitation in a convenient and suitable vessel the solution may be taken away through a convenient filter to the evaporating-pans, and the superphosphate of lime completed, as described in the paragraph hereof numbered 1.

4. To phosphoric acid or phosphoric acid intermixed with water, or to solutions of phosphate of lime having an excess of phosphoric acid, either lime or any of the forms of carbonate of lime, or any of the forms of phosphate of lime, or chloride of calcium, or mixtures thereof, is or are added in such proportion that the solution or mixture shall, after such addition, contain, by preference, seventy-one parts of phosphoric acid for every twenty-eight parts of lime or twenty parts of calcium. If five tons of phosphoric acid of twenty per cent. purity be used, it may be intermixed with about eight hundred-weight of lime, or an equivalent of lime or calcium in any of the other forms, except that when phosphates of lime are used an allowance must be made for the lime which the phosphoric acid of the phosphate of lime retains as superphosphate of lime. For the convenience of manufacture it is preferred that such phosphoric acid shall be reduced in strength to about ten per cent. purity by the addition of an equal bulk of water before the intermixture of any of the above forms of lime or calcium. When the phosphoric acid contains impurities which separate lime, such as, for example, sulphuric acid, it is necessary to make allowance for the lime it requires, and to use proportionately more lime or calcium in any of the above-mentioned forms. The mixture, having been well agitated, will be ready for running through any convenient and suitable filter to the evaporating-pans, and the manufacture of the superphosphate of lime is finished, as described in the paragraph herein numbered 1.

5. It is preferred to carry out these processes in the manner specified and described, and by these means a superphosphate of lime is obtained which contains a high percentage of soluble phosphate of lime; but if a product yielding a higher percentage of soluble phosphate of lime or free phosphoric acid is required, then an increased proportion of phosphoric acid is allowed to remain in or to be added to the solution or mixture, while, on the other hand, when any smaller percentage of soluble phosphate of lime is required, or when the superphosphate of lime is required in any less rapidly soluble condition, then a larger proportion of lime is allowed to remain in or to be added to the solution or mixture. On this principle superphosphate of lime is produced in any more or less rapidly soluble condition, according as the varying requirements of the land may render most desirable.

It should be observed that the proportions hereinbefore mentioned of the substances employed for the purposes of this invention are approximate and admit of some variation without departing from the main principles of the invention, as will be well understood by persons conversant with chemical manufactures and operations.

I claim as my invention—

The process for production of superphosphate of lime, consisting of the several steps in their order of succession, substantially as described.

BENJAMIN TANNER.

Witnesses:
  H. W. COLLINS,
    *Notary Public, Liverpool.*
  EDWD. L. DUFFIELD,
    *Clerk to Messrs. Anderson, Collins*
      *& Robinson, Solicitors, Liverpool.*